United States Patent
Iacono et al.

(10) Patent No.: US 7,917,092 B2
(45) Date of Patent: Mar. 29, 2011

(54) BEAM SELECTION APPARATUS AND METHOD IN VOICE OVER INTERNET PROTOCOL OVER SWITCHED BEAM WIRELESS LOCAL AREA NETWORK

(75) Inventors: Ana Lucia Iacono, Garden City, NY (US); Arty Chandra, Manhasset Hills, NY (US); Inhyok Cha, Yardley, PA (US); John S. Chen, Downingtown, PA (US); Yingxue Li, Exton, PA (US); James C. Otto, Melbourne, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 1495 days.

(21) Appl. No.: 11/302,299

(22) Filed: Dec. 13, 2005

(65) Prior Publication Data

US 2006/0203789 A1 Sep. 14, 2006

Related U.S. Application Data

(60) Provisional application No. 60/636,334, filed on Dec. 14, 2004.

(51) Int. Cl.
*H04B 1/00* (2006.01)
*H04B 15/00* (2006.01)
*H04B 17/00* (2006.01)
*H04M 1/00* (2006.01)
*H04W 4/00* (2009.01)

(52) U.S. Cl. ............. 455/63.4; 455/562.1; 455/67.11; 455/575.7; 370/338

(58) Field of Classification Search ............. 455/562.1, 455/41.2, 63.4, 67.11, 63.1, 575.7; 370/338
See application file for complete search history.

(56) References Cited

U.S. PATENT DOCUMENTS

| | | | |
|---|---|---|---|
| 6,611,231 B2 | 8/2003 | Crilly et al. | 342/378 |
| 7,103,386 B2 * | 9/2006 | Hoffmann et al. | 455/562.1 |
| 7,260,079 B1 * | 8/2007 | Chapman et al. | 370/338 |
| 2004/0114535 A1 * | 6/2004 | Hoffmann et al. | 370/252 |

* cited by examiner

*Primary Examiner* — Un C Cho
(74) *Attorney, Agent, or Firm* — Volpe and Koenig, PC

(57) ABSTRACT

An apparatus and a method for improving packet transmission and reducing latency in VoIP over WLAN using switched beam antennas having multiple directional antenna beams are disclosed. In an access point having a switched beam antenna, or other smart antenna system, the present invention extends the coverage area of an access point for authentication and association of a new WTRU, extends the access points coverage area during in session transmissions with a WTRU, and adjusts data rates. The method also controls Contention Period (CP)/Contention Free Period (CFP) timing amongst beams emanating from an access point having a switched beam antenna, or other smart antenna system. Fast diversity switching, frame level switching, lowered data rates, and scanning multiple directional antenna beams for the optimum transmission beam are disclosed to improve beam selection and packet transmission.

6 Claims, 3 Drawing Sheets

BEAM SELECTION APPARATUS AND METHOD IN VOICE OVER INTERNET PROTOCOL OVER SWITCHED BEAM WIRELESS LOCAL AREA NETWORK

CROSS REFERENCE TO RELATED APPLICATION

This application claims the benefit of U.S. Provisional Application No. 60/636,334 filed Dec. 14, 2004, which is incorporated herein by reference as if fully set forth.

FIELD OF INVENTION

The present invention relates generally to Voice over Internet Protocol (VoIP). More specifically, the present invention is a beam selection method for VoIP over a wireless local area network (WLAN).

BACKGROUND

In Voice over Internet Protocol (VoIP), packetized voice data flows over the Internet, a general-purpose packet-switched network, instead of traditional dedicated, circuit-switched voice transmission lines, such as the public switched telephone network (PSTN). VoIP over WLAN is where WLAN network architecture, such as IEEE 802.11x protocol, is utilized as the final segment of the packet switched portion of the transport sequence.

Referring to FIG. 1, an exemplary VoIP over WLAN communication system 100 is shown. A WLAN access point 100 provides wireless network capabilities to various wireless transmit/receive units (WTRUs) $110_A$, $110_B$. In this exemplary implementation, WTRU $110_B$ is a VoIP handset. The WLAN portion of the system 100 is designated as 101. The WLAN access point 105 provides access to the Internet 120 by way of a modem 130. A gateway 140 connects the packet switched domain 102 to the circuit switched domain 103, and converts packet switched data to circuit switched data. A typical circuit switched network for handling voice telephone communications is the public switched telephone network (PSTN) 150. The gateway 140 connects the Internet 120 to the PSTN 150. A standard wired telephone 160 completes the system.

In typical data applications over Internet Protocol (IP) networks, data flows are generally asymmetric. That is, the quantity of data downloaded from the Internet is typically much greater than the quantity of data uploaded to the Internet. In contrast, in a typical VoIP implementation, such as the exemplary one shown in FIG. 1, data flows are generally symmetric. The nature of voice communications requires that the amount of data flowing to the VoIP handset $110_B$ be roughly equivalent to the amount of data flowing away from the VoIP handset $110_B$, of course depending on the loquaciousness of the users. Data flow symmetry is a particular problem in the wireless WLAN portion of the VoIP system. Compounding this problem, IP does not provide any mechanism to ensure that data packets are delivered in sequential order. Time sensitive applications, such as VoIP, are faced with the task of restructuring streams of received packets which may be received out of order or missing packets altogether. Ensuring a consistent audio stream with minimal latency is required for packet based voice applications.

Quality of Service (QoS) refers to the capability of a network to provide priority to selected network traffic. QoS is typically implemented in various types of networks including Frame Relay, Asynchronous Transfer Mode (ATM), Ethernet and 802.x networks, SONET, and IP-routed networks that may use any or all of these underlying technologies. QoS methods provide varying levels of priority to individual data flows or packets including dedicated bandwidth, controlled jitter and latency, and improved loss characteristics. Real-time and interactive applications, such as VoIP, require a minimal QoS, or priority, in order to handle the symmetric nature of real-time voice communications, and to deal with inherent IP shortcomings such as disordered packets.

Therefore, an apparatus and a method for improving packet transmission generally and for reducing latency specifically in VoIP over WLAN is desired.

SUMMARY

An apparatus and a method for improving packet transmission and reducing latency in VoIP over WLAN using switched beam antennas having multiple directional antenna beams are disclosed. In an access point having a switched beam antenna, or other smart antenna system, the present invention extends the coverage area of an access point for authentication and association of a new WTRU, extends the access points coverage area during in session transmissions with a WTRU, and adjusts data rates. The method also controls Contention Period (CP)/Contention Free Period (CFP) timing amongst beams emanating from an access point having a switched beam antenna, or other smart antenna system. Fast diversity switching, frame level switching, lowered data rates, and scanning multiple directional antenna beams for the optimum transmission beam are disclosed to improve beam selection and packet transmission.

BRIEF DESCRIPTION OF THE DRAWINGS

A more detailed understanding of the invention may be had from the following description of preferred embodiments, given by way of example and to be understood in conjunction with the accompanying drawing wherein.

DETAILED DESCRIPTION OF THE PREFERRED EMBODIMENTS

Figure 1:
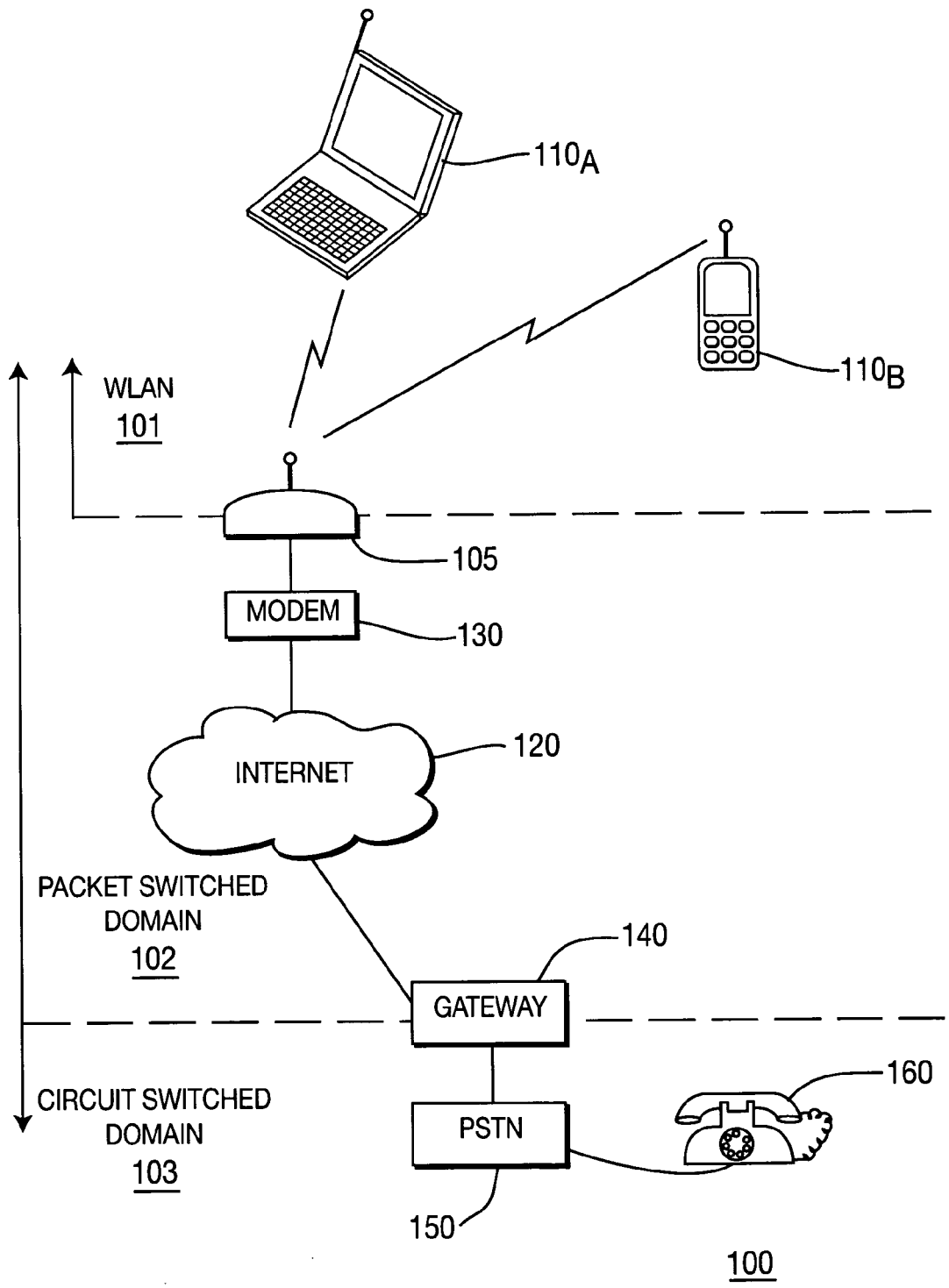
FIG. 1 is an illustration of an exemplary VoIP over WLAN application.

The present invention will be described in more detail with reference to the drawing figures wherein like numerals indicate like elements.

As used herein, the term wireless transmit/receive unit (WTRU) includes, but is not limited to, a cell phone, pager, wireless equipped laptop, user equipment (UE), mobile station (MS), a fixed or mobile subscriber unit, or any other device capable of operating in a wireless communication system. A WTRU also includes generally a VoIP handset, and in particular a VoIP handset capable of wireless communications in accordance with the IEEE 802.11x standards. As used herein, the term Access Point (AP) includes, but is not limited to, a base station, Node-B, or any other type of interfacing equipment in a wireless communication network.

The present invention is a method for improving packet transmission in VoIP over WLAN communication systems by selecting the optimum beam of a switched beam antenna for transmission. In a preferred embodiment of the present invention, referring to FIG. 2, an access point 200 containing a switched beam antenna serves a coverage area 210. In this embodiment, the switched beam antenna has a left beam, a right beam, and an omni directional beam. The number and directionality of beams may be set as desired, and it should be understood by those of skill in the art that this embodiment is not meant to limit the scope of the invention. It should also be understood by those skilled in the art that the depicted radiation patterns emanating from access point 200 are of a given field signal intensity and are not nearly as sharply defined as depicted. While the access point 200 is described as utilizing a switched beam antenna, beam forming antenna techniques or other smart antenna techniques may be implemented in the present invention.

The access point 200 extends its range by transmitting in only one directional antenna at any given time period, while maintaining a constant transmission power. The directional antennas through which transmissions occur are rapidly cycled, and transmissions occur in a single directional antenna for a fixed time period. The omni-directional antenna may be included in the cycling.

Figure 2:
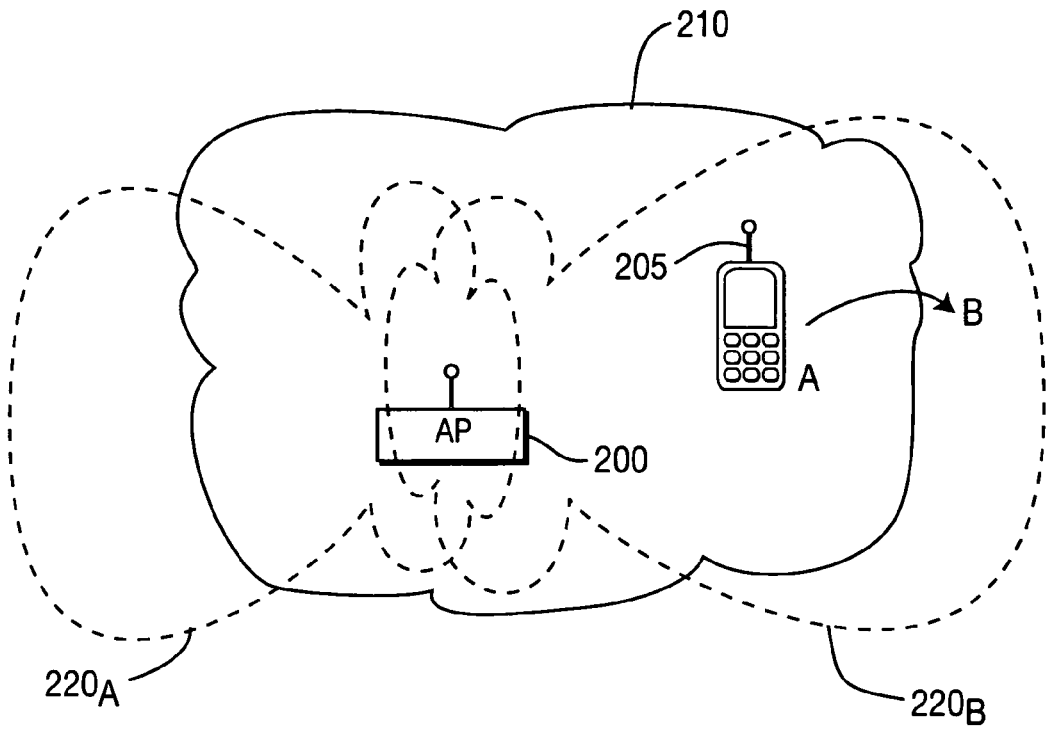
FIG. 2 is an illustration of a VoIP over WLAN access point performing range extension in accordance with the present invention.

Still referring to FIG. 2, the access point 200 transmits, for example, on each directional beam, that is the left beam and the right beam, alternating between the two beams at a high frequency. Coverage areas $220_A$ and $220_B$ are created. Extended coverage area $220_A$ exists when the left directional antenna is utilized, and extended coverage area $220_B$ exists when the right directional antenna is utilized. By maintaining transmission power levels, each directional beam $220_A$, $220_B$ extends further than the omni directional beam 210. This allows a mobile user in communication with the access point 200 to maintain a connection as the user moves away from the access point 200. For example, a VoIP handset 205 located within the coverage area 210 authenticates with the access point 200. The handset 205, while in session, moves from position A to position B (position B is outside of the omni directional coverage area 210), while maintaining a connection with the access point 200 because position B is within directional coverage area $220_B$. Range extension facilitates handover and reduces dropped calls near the cell edge.

Alternatively, a fast switched diversity scheme may be implemented for transmitting and receiving using its plurality of directional antennae. Typical switched diversity systems are those employing two or more antennas for the purpose of maintaining a communications link should the signal from one of those antennas become blocked, or severely degraded. In these circumstances, the directional antennas are physically separated (i.e. diverse) by a sufficient distance that when one antenna is blocked or degraded, there is a very high probability that the other antenna will still be capable of communications. Accordingly, a fast switched diversity scheme that switches between directional beams may be implemented in accordance with the present invention. This diversity scheme may be implemented in access point 200, or alternatively in a WTRU having a switched beam antenna.

Figure 3:
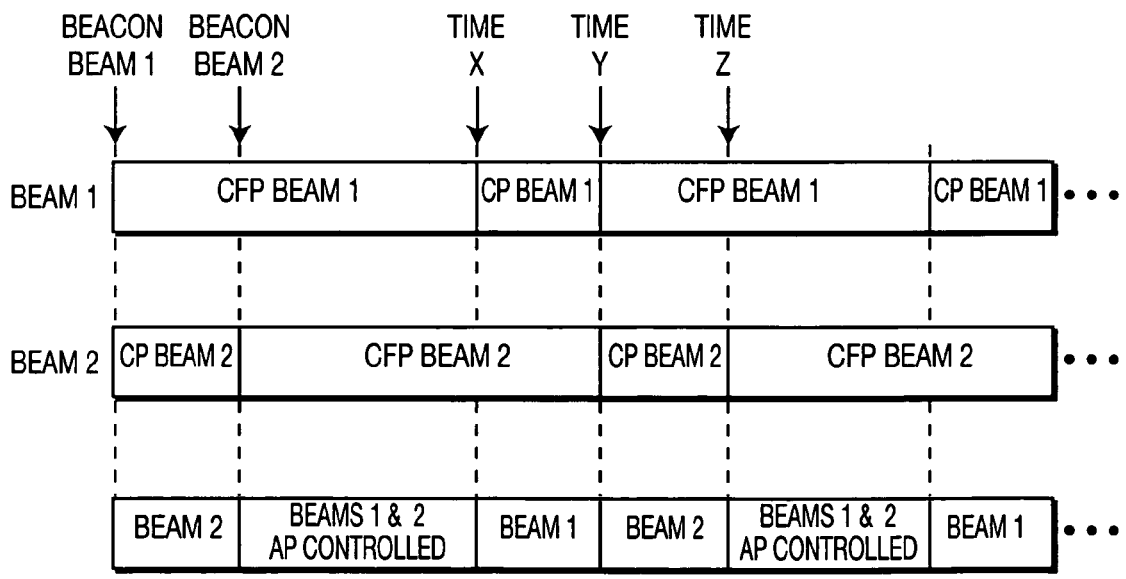
FIG. 3 is a signal timing diagram of an access point comprising a switched beam antenna wherein contention periods and contention free periods are exclusively alternated in directional antenna beams.

In another embodiment of the present invention, referring to FIG. 3, a diagram 300 of contention period (CP)/contention free period (CFP) timing of access point 200 is shown. In order to maximize the range of access point 200 with respect to the authentication and association of new WTRUs within the access point's 200 coverage area, the access point 200 utilizes staggered contention periods in each directional antenna beam. On Beam 1, access point 200 transmits a beacon 310. Beacon 310 announces to WTRUs listening to Beam 1 that the CFP on Beam 1 ends at time X, and the CP on Beam 1 ends at time Y (i.e. the CP on Beam 1 is from time X to time Y.) On Beam 2, access point 200 transmits a beacon 320 announcing to WTRUs listening to Beam 2 that the CFP on Beam 2 ends at time Y, and the CP on Beam 2 ends at time Z (i.e. the CP on Beam 2 is from time Y to time Z.)

Prior to time X, CFPs exist in both Beam 1 and Beam 2 and the access point 200 communicates with associated WTRUs using well known signaling and scheduling techniques. The present invention allows the access point to transmit in one beam only using a constant transmission power, thereby extending the range of the beam, and coordinate authentication and association at the end of each beam's respective CFP.

Alternatively, the timing of beacons 310, 320 may be modified, and using a beacon to announce the contention free period may be supplanted altogether. Various other signaling techniques that are well known in the art may be used. Additionally, the time intervals at which the beacons are cycled are chosen such that real time voice communications can occur without noticeable latency effects. It should be understood by those of skill in the art that the timing of the CFP in both Beam 1 and Beam 2 may be timed to coincide with a switched diversity beam switching scheme. For example, access point 200 operating in a CFP time slot, such as between beacon 320 and time X, will time CFP transmissions for Beam 1 when access point 200 is actively using Beam 1. These transmissions will be scheduled periodically, and during every gap in the transmissions on Beam 1 the access point 200 will transmit on Beam 2, wherein CFP transmissions will be scheduled accordingly.

In the case where VoIP handset 205 contains a switched beam antenna or other smart antenna system, the VoIP handset 205 may also implement a switched diversity scheme. Additionally, frame level switching may be implemented at the handset 205 or the access point 200. In frame level switching, the antenna used to receive a transmission is switched at a rate higher than the physical level frame rate. For example, a typical frame level switching scheme may switch antennas at a frequency three times that of the frame rate. By receiving the same transmission on multiple antennas a diversity gain is realized at the receiving device, thereby reducing interference and fading.

In another embodiment of the present invention, VoIP handset 205 containing a switched beam antenna or some other smart antenna system may actively scan for correct directional antennas. This scanning can be continuous, or it can be triggered by an event or a condition. An example of a condition triggering scanning may be the detection of variations in signal quality metrics, such as, for example, received signal strength indicator (RSSI), angle of arrival (AOA), signal to noise ratio (SNR), back-off time, and packet error rate (PER). Examples of events triggering scanning may be, for example, certain user interface combinations that indicate mobility.

Scanning directional antennas to determine and select the best beam for transmission may be accomplished by sending a fake packet on the directional antenna or in the omni directional antenna and then receiving an acknowledgement (ACK) in response on a directional antenna or the omni directional antenna. The fake packet may be a ready-to-send/clear-to-send (RTS/CTS) packet or any other IEEE 802.11 packet or any other higher level packet.

In order to minimize effects on bandwidth and throughput, fake packets are preferably sent when there are no other transmissions. For example, perhaps for a given user's session, silence for 10 ms almost always means silence for 100 ms. In this example, scanning for optimum directional antennas may be done after silence for at least 10 ms is detected, thereby minimizing any likely effects on throughput. This opportunistic scanning technique is particularly applicable to VoIP codecs that implement silence suppression. Accordingly, a VoIP codec may exploit this fact, and rescanning for optimum beams may occur after 10 ms but before 100 ms from the start of silence. In this manner, the effect of beam rescanning on transmission rates is minimized because transmission and scanning do not occur simultaneously.

Figure 4:
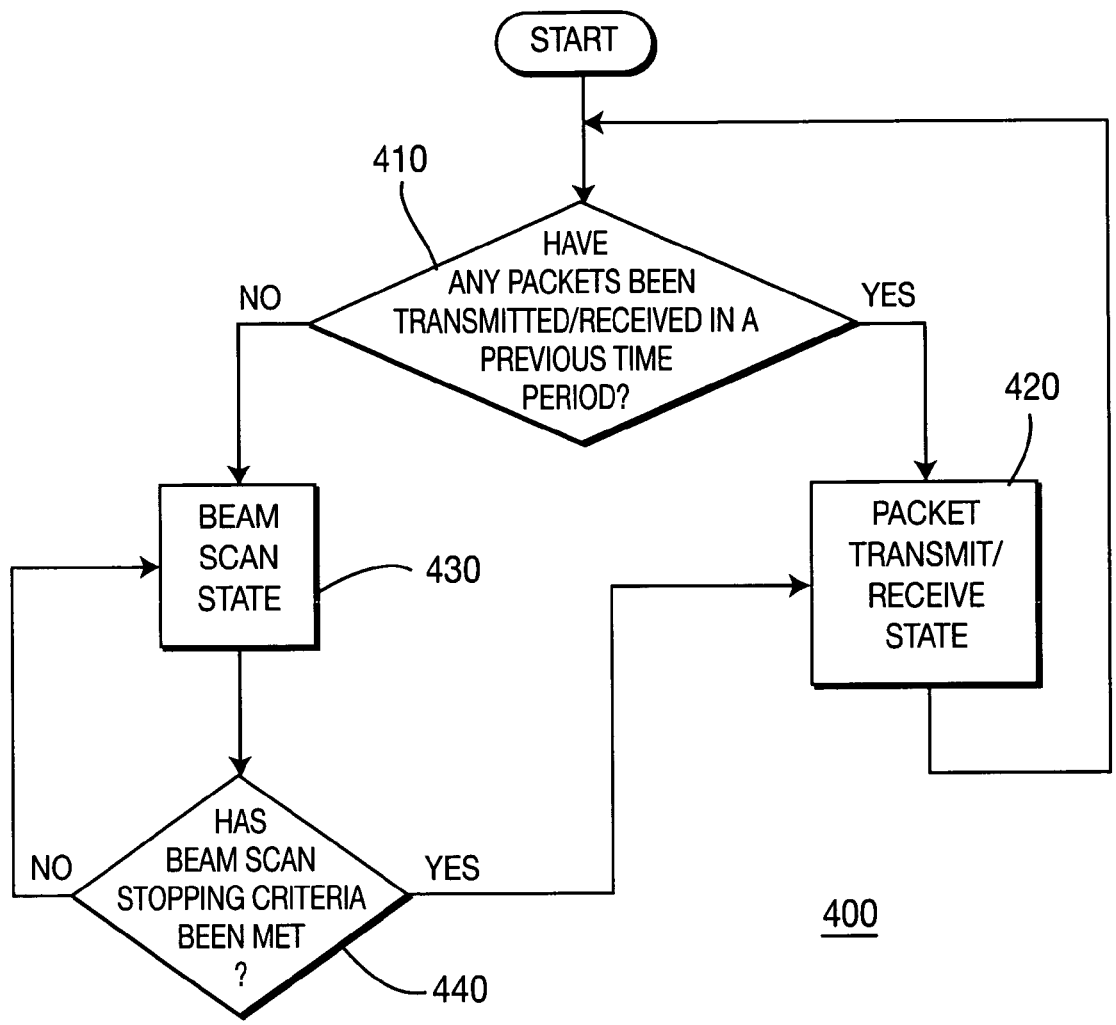
FIG. 4 is a flow chart of a method for beam scanning in a VoIP over WLAN communication system wherein beam scanning occurs when silent periods are predicted.

Referring to FIG. 4, a flow chart of a method 400 for beam scanning during predicted silent periods is shown. The method determines whether any packets have been transmitted or received during a previous time interval, for example, the past 10 milliseconds, (step 410). If packets have been transmitted or received during the specified time interval, the device is placed in the packet transmit/receive state and packet transmission and reception proceeds as normal, (step 420). If, on the other hand, the method determines that no packets have been transmitted or received during the previous time interval, the device is placed in a beam scan state, (step 430). In the beam scan state, the device tests beam quality characteristics in order to determine the best beam for transmission and reception. The method then determines whether any of the beam scan stopping criteria have been met, (step 440). The beam scan stopping criteria may be, for example, the detection of packet transmission or reception. Alternatively, the beam scan stopping criteria may be a predetermined time interval, for example 80 milliseconds, after which the beam scan stopping criteria is met. If a beam scan stopping criterion is met, the device is placed in the packet transmit/receive state 420 for further transmission and reception of packets. The method is repetitive; that is, the device will be placed back in the beam scan state 430 if packet transmission and reception ceases for the predetermined time interval and the device will be placed in the beam scan state 430.

Furthermore, packet data transmission may be improved by lowering the data rates at which the VoIP handset communicates with the access point 200. By lowering the data rate, the PER will in turn be lowered. This minimizes the latency of time sensitive real-time voice communications. Alternatively, if the size of a data packet is below a predetermined size threshold, the data packet is transmitted at a lower data rate. In this manner, VoIP data packets that are typically a uniform size can be separated from other non-VoIP data packets.

The techniques disclosed above may be used alone or in combination to improve beam selection in an access point or a WTRU. Subsets or groupings of techniques disclosed above may also be used, as desired, to improve the beam selection of a given application.

Although the present invention has been described with reference to the preferred embodiments, those skilled in the art will recognize that changes may be made in form and detail without departing from the scope of the invention.

What is claimed is:

1. A method for a VoIP wireless transmit/receive unit (WTRU) having a switched beam antenna for selecting an optimum beam from a plurality of directional beams, the method comprising the steps of:
   determining whether any data packets have been transmitted or received using a particular directional beam in a time period;
   scanning the particular directional beam when it is determined that no data packets have been transmitted or received in the time period;
   stopping the scanning when a beam scan stopping criterion is met; and
   transmitting and receiving data packets.

2. The method of claim 1 wherein the beam scan stopping criterion is a time out.

3. The method of claim 1 wherein the beam scan stopping criterion is the detection of packet reception or transmission.

4. A VoIP enabled WTRU having a switched beam antenna for selecting an optimum beam from a plurality of directional beams, the WTRU comprising:
   a processor configured to determine whether any data packets have been transmitted or received using a particular directional beam in a time period; and
   a scanner for scanning the particular directional beam when the processor determines that no data packets have been transmitted or received in the time period, wherein the scanning is stopped when a beam scan stopping criterion is met.

5. The WTRU of claim 4 wherein the beam scan stopping criterion is a time out.

6. The WTRU of claim 4 wherein the beam scan stopping criterion is the detection of packet reception or transmission.

* * * * *